US009693123B2

(12) United States Patent
Lord (10) Patent No.: US 9,693,123 B2
(45) Date of Patent: Jun. 27, 2017

(54) OPTICAL SWITCH (71) Applicant: BRITISH TELECOMMUNICATIONS PUBLIC LIMITED COMPANY, London (GB)

(72) Inventor: Andrew Lord, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/780,932

(22) PCT Filed: Mar. 12, 2014

(86) PCT No.: PCT/GB2014/000092
§ 371 (c)(1),
(2) Date: Sep. 28, 2015

(87) PCT Pub. No.: WO2014/162108
PCT Pub. Date: Oct. 9, 2014

(65) Prior Publication Data
US 2016/0057513 A1 Feb. 25, 2016

(30) Foreign Application Priority Data
Apr. 3, 2013 (GB) .................................. 1305985.2

(51) Int. Cl.
H04Q 11/00 (2006.01)
H04J 14/02 (2006.01)

(52) U.S. Cl.
CPC ...... H04Q 11/0005 (2013.01); H04J 14/0205 (2013.01); H04J 14/0217 (2013.01);
(Continued)

(58) Field of Classification Search
CPC .................................................. H04Q 11/0005
See application file for complete search history.

(56) References Cited

U.S. PATENT DOCUMENTS 5,762,788 A 6/1998 Gullett
6,542,268 B1 4/2003 Rotolo et al.
(Continued)

FOREIGN PATENT DOCUMENTS

EP 1199905 A2 4/2002
EP 2680606 A1 1/2014

OTHER PUBLICATIONS

Steven Gringeri et al, "Flexible Architectures for Optical Transport Nodes and Networks", IEEE Communications Magazine, IEEE Service Center, Piscataway, US, vol. 48, No. 7, Jul. 1, 2010, pp. 40-50.
(Continued)

Primary Examiner — Shi K Li
(74) Attorney, Agent, or Firm — Patterson Thuente Pedersen, P.A.

(57) ABSTRACT

An optical switch suitable for use in an add/drop of an optical network node having F>1 optical fiber per direction, the F fibers together carrying optical signals comprising up to N independent wavelength channels, is disclosed. The switch includes an Optical Cross-Connect (OXC) having F input ports and N output ports. F optical splitters are connected to the OXC, the input and output ports of the optical splitters defining ports of the OXC. The OXC is controllable to switch optical signals arriving at any of the F switch input ports to the input port of any of the F optical splitters such that each switch input port is switched to an optical splitter having at least as many splitter output ports as the number of independent wavelength channels received at the switch input port. A method for splitting optical signals is also disclosed.

21 Claims, 9 Drawing Sheets (52) U.S. Cl.
CPC ....... *H04J 14/0204* (2013.01); *H04J 14/0219* (2013.01); *H04Q 2011/0015* (2013.01); *H04Q 2011/0058* (2013.01)

(56) References Cited

U.S. PATENT DOCUMENTS

| | | | |
|---|---|---|---|
| 6,574,386 B1 * | 6/2003 | Sufleta | H04Q 11/0005 385/15 |
| 6,661,973 B1 * | 12/2003 | Huber | H04J 14/02 398/141 |
| 6,792,208 B1 | 9/2004 | Mukherjee et al. | |
| 8,538,260 B2 | 9/2013 | Niven-Jenkins et al. | |
| 9,271,058 B2 | 2/2016 | Lord | |
| 2002/0054407 A1 | 5/2002 | Yamada et al. | |
| 2002/0159678 A1 | 10/2002 | Derventzis | |
| 2003/0138252 A1 | 7/2003 | Paiam et al. | |
| 2003/0163555 A1 | 8/2003 | Battou | |
| 2007/0147841 A1 | 6/2007 | Takita et al. | |
| 2009/0232497 A1 | 9/2009 | Archambault et al. | |
| 2011/0110662 A1 | 5/2011 | Wellbrock et al. | |
| 2011/0164876 A1 | 7/2011 | Fujita et al. | |
| 2011/0217038 A1 * | 9/2011 | Zhang | H04Q 11/0005 398/48 |
| 2011/0262142 A1 | 10/2011 | Archambault | |
| 2012/0020664 A1 | 1/2012 | Sakurai et al. | |
| 2012/0301141 A1 | 11/2012 | Sakamoto et al. | |
| 2013/0045006 A1 | 2/2013 | Dahan et al. | |
| 2013/0142510 A1 | 6/2013 | Zhou | |
| 2014/0193148 A1 | 7/2014 | Dahlfort et al. | |
| 2016/0072608 A1 | 3/2016 | Wright et al. | |
| 2016/0241353 A1 | 8/2016 | Wright et al. | |

OTHER PUBLICATIONS

Extended European Search Report for European Patent Application No. 12250127.3, dated Dec. 17, 2012, 7 pages.
International Search Report, for PCT Application No. PCT/GB2013/000209, dated Jun. 17, 2013, 3 pages.
International Search Report, for PCT Application No. PCT/GB2014/000090, dated Jun. 16, 2014, 2 pages.
International Search Report, for PCT Application No. PCT/GB2014/000091, dated Jul. 2, 2014, 2 pages.
Application and File History for U.S. Appl. No. 14/409,745, filed Dec. 19, 2014. Inventors: Lord et al.
Application and File History for U.S. Appl. No. 14/780,948, filed Sep. 28, 2015. Inventors: Lord.
Application and File History for U.S. Appl. No. 14/780,959, filed Sep. 28, 2015. Inventors: Lord.
Taylor, "Trends in Dynamic Optical Networks", Nov. 5, 2007, 8 pages.
Frisken, Steven et al., "Wavelength-selective Reconfiguration in Transparent Agile Optical Networks", Proceedings of the IEEE, vol. 100, No. 5, May 2012.
Wang et al., "OSPF Extensions for Routing Constraint Encoding in Flexible-Grid Networks" IETF Network Working Group, China Academy of Telecom, MIIT, Internet Draft, Jul. 16, 2012.
International Search Report, International Application No. PCT/GB2014/000092, mailed Jul. 2, 2014, 2 pages.

* cited by examiner

OPTICAL SWITCH

RELATED APPLICATIONS

The present application is a National Phase entry of PCT Application No. PCT/GB2014/000092, filed Mar. 12, 2014, which claims priority to GB 1305985.2, filed Apr. 3, 2013, the contents of which are incorporated herein by reference in their entireties.

TECHNICAL FIELD

The present invention relates to optical data transmission and particularly but not exclusively to an optical switching apparatus for splitting optical signals.

BACKGROUND

In optical data transmission, a signal to be transmitted is sent as a sequence of light pulses over an optical fiber to a photo detector which converts the optical signal into an electronic one for subsequent processing. The most straight-forward method of data transmission is to provide a different optical fiber per transmission. However, the use of a different fiber per transmission is expensive and therefore various techniques were proposed to allow multiple signals to be transmitted over a single fiber. The two most common techniques are Time Division Multiplexing (TDM) and Wavelength Division Multiplexing (WDM).

In TDM, separate input signals are carried on a single fiber by allocating time transmission windows. The input signals are fed to a multiplexer which schedules use of the optical fiber so that each input signal is allowed to use the fiber in a specific time slot. At the receiver, synchronization techniques are used to ensure that the different input signals are sent on to the appropriate destination.

In WDM, the fiber is shared by sending each input signal at the same time, but on a different carrier wavelength channel, for example a first signal could be transmitted using a carrier wavelength of 1539 nm and another signal is transmitted using a carrier signal of 1560 nm.

All modern optical data transmission utilizes fiber TDM, with core transmission additionally utilizing WDM. In core data transmission, individual signals rates of up to 100 Gbit/sec are achieved through the use of TDM; these individual signals are then multiplexed onto a signal fiber through WDM in order to further enhance the transmission rate.

Considering WDM in greater detail, a grid of wavelengths is specified by the International Telecommunication Union (ITU) so that compliant equipment from different manufacturers can operate together. The ITU has specified a number of Dense Wavelength Division Multiplexing grid sizes at 12.5 Ghz, 25 Ghz, 50 Ghz and 100 Ghz. 50 Ghz is currently the most popular channel and, using the DP-QPSK modulation format, it is possible to fit a 100 Gbit/s signal within a single channel in the 50 Ghz grid. However, research into optical transmission beyond 100 Gbit/s has shown that higher spectral efficiency formats have to be used, or the spectral width of the signals must be increased to support 400 Gbit/s or 1 Tbit/s transmission. Utilizing modulation formats with higher spectral efficiencies limits the distance the signal can propagate due to OSNR penalties, and increasing the spectral width means that the signal can no longer fit within the widely deployed 50 Ghz ITU grid. To overcome these problems, flexible grid or Flexgrid networks have been proposed. In this scheme, arbitrary sized wavelength blocks can be specified by the network owner, thereby accommodating new bit rate services.

In order to transmit signals by WDM, whether on the fixed grid or flexible grid network, two signals having different carrier wavelengths must be multiplexed onto the same line. Providing the carrier wavelengths are sufficiently different, the signals will not interfere with each other. At the end of the optical fiber, the incoming light signals are demultiplexed into the individual signals, which are subsequently processed as required.

Current telecommunications networks comprise a single optical fiber for data transmission in a given direction. The nodes at which these fibers meet are classified according to the number of fiber directions that converge at that node. For example, if optical fibers deliver data to and from North, South and West then the node at which these fibers meet is a degree three node. It will be appreciated that six fibers converge at a degree node if the network comprises a single fiber per direction: one fiber for data transmission from North, one fiber for data transmission to North, etc.

However, due to the ever increasing bandwidth demands on telecommunications networks, it is anticipated that multiple fibers per direction will be required in the near future. Accordingly, many more fibers will converge at a node of a given degree. For example, a degree three node in a "multi-fiber" network may comprise six or more fibers. In a multi-fiber arrangement such as this, it is envisaged that a number of independent channels or superchannels will be spread across the multiple fibers, the number of channels or superchannels carried on any one of the fibers being variable in accordance with the optical spectrum and/or the network architecture.

One known device for demultiplexing WDM signals is a grating demultiplexer, which operates on the principle of light dispersion: as an optical signal is passed through a grating demultiplexer, the various wavelengths contained within that signal are deflected by varying angles. The grating therefore acts to break down the optical signal into its constituent wavelength spectrum, which enables certain wavelength channels within that spectrum to be isolated and subsequently processed as required. Grating demultiplexers work moderately well with the fixed grid network, providing there are a low number of input fibers. However, there are likely to be problems associated with the use of grating demultiplexers in the flexible grid network and/or for large numbers of input fibers. One problem is that grating demultiplexers demultiplex at fixed 50 GHz outputs and are therefore incompatible with Flexgrid. Another problem is that grating demultiplexers are directional: the direction at which a certain wavelength channel is output from a grating demultiplexer is a function of the wavelength thereof. This is particularly problematic in a "multi-fiber" network since it is not possible to direct a single wavelength channel carried on multiple fibers to a single spatial location. Yet another problem is a lack of flexibility: the only way in which to change the wavelength channel(s) received by particular receivers is to physically move the equipment at the exchange.

SUMMARY OF THE PRESENT INVENTION

Embodiments disclosed herein address the above issues. In one aspect, an embodiment provides an apparatus for splitting optical signals, the apparatus being configured to handle optical signals comprising up to N independent wavelength channels, the apparatus comprising: F optical splitters, each optical splitter comprising a splitter input port and a plurality of splitter output ports, at least one of said optical splitters comprising a different number of splitter output ports to at least another of said optical splitters; an all optical matrix switch comprising F switch input ports, the switch being controllable to switch optical signals arriving at any of the F switch input ports to the input port of any of the F optical splitters; and wherein the splitter input ports and splitter output ports define ports of the all optical matrix switch.

In use, each of the F optical input ports receives optical signals carried on a respective optical fiber. It is envisaged that the matrix switch will be controlled to switch signals such that a switch input port receiving optical signals comprising a given number of independent wavelength channels is coupled to an optical splitter having at least as many splitter output ports as said given number of independent wavelength channels. If controlled in this way, the apparatus produces at least as many copies of a given optical signal as wavelength channels contained within that signal. Each of the copies may be subsequently filtered according to wavelength in order to obtain a separate optical signal for each wavelength channel received at the switch input ports. Alternatively, or in addition thereto, the full optical spectrum of each of the copies may be transmitted to coherent receivers capable of providing their own wavelength filtering via the local oscillators thereof.

It will be appreciated that one or more embodiments may form at least part of an add/drop of an optical node, particularly an optical node arranged to receive more than one optical fiber per direction. In contrast to known add/drops, embodiments utilize optical splitters as opposed to grating demultiplexers. Accordingly, embodiments avoid the above-mentioned problems associated with grating demultiplexers such as the incompatibility with Flexgrid and the lack of flexibility. Furthermore, whilst optical splitters do not provide any wavelength selection, this is not a particular problem in view of the fact that coherent receivers are capable of providing their own wavelength filtering via the local oscillators thereof.

Another advantage of embodiments is that they constitute an efficient use of splitting capacity. Instead of providing every input optical fiber with its own dedicated splitter comprising N splitter output ports, embodiments recognize the fact that the N independent wavelength channels will be distributed across F optical fibers received at respective F switch input ports: a switch input port receiving a large number of wavelength channels will be optically coupled to an optical splitter comprising large numbers of splitter output ports, whereas a switch input port receiving a smaller number of wavelength channels will be optically coupled to an optical splitter comprising a smaller number of splitter output ports. If the distribution of wavelength channels across the input optical fibers changes then the switch can be controlled to reconfigure the optical coupling between the switch input ports and the input ports of the optical splitters. In this way, embodiments minimize the total splitting capacity that is required.

The splitter input ports of the optical splitters may define ports of the optical matrix switch. The splitter output ports of the optical splitters may define further ports of the optical matrix switch. Accordingly, the above-described minimization of splitting capacity may serve to minimize the number of ports required on the optical matrix switch and hence minimize the financial cost of the optical matrix switch.

The apparatus may comprise control means for controlling the all optical matrix switch.

The control means may comprise a processor arranged to execute a control plane function having overall network control, the apparatus being a slave to the control plane function. The control plane function may be programmable by a human user. In this way, the optical matrix switch may be controllable by a human user.

Alternatively, the control means may be arranged to receive information relating to the number of independent wavelength channels N received at each of the switch input ports and switch optical signals arriving at each of the switch input ports in accordance with said information. The apparatus may comprise means for determining said information relating to the number of independent wavelength channels N arriving at each of the switch input ports and provide said information to the control means.

The switch comprises a plurality of switch output ports. The switch may comprise N switch output ports such that each independent wavelength channel may be switched to at least one switch output port.

It is envisaged that a switch input port will be coupled directly to a switch output port if the optical signals received at that switch input port comprise fewer than two wavelength channels.

The switch may be controllable to switch optical signals from any of the splitter output ports to any of the switch output ports. Advantageously, this enables optical signals received at any switch input port to be switched to any switch output port or indeed more than one switch output port if required. In this arrangement, it is easy to direct optical signals carried by one of the input optical fibers to a different receiver: all that is required is to change the configuration of the switch, namely by recoupling the switch input port to a different optical splitter and/or by recoupling the optical splitter to a different switch output port.

Each of the F optical splitters may be configured to receive optical signals comprising a plurality of independent wavelength channels at the input port thereof and output optical signals comprising said plurality of independent wavelength channels at each of the output ports thereof. In other words, the F optical splitters should be suitable for receiving WDM signals and may be non-wavelength selective.

The F optical splitters may be 1×M passive optical splitters, where M is an integer greater than one and which may be different for each optical splitter.

It is envisaged that the optical coupling between the switch input ports and the splitter input ports is exclusive: if a given switch input port is switched to the splitter input port of a given optical splitter then (i) said switch input port cannot be optically coupled to any other splitter input ports and (ii) said splitter input port cannot be coupled to any other switch input ports.

F and N are both greater than one.

Each of the F optical splitters may comprise a different number of splitter output ports to respective others of the F optical splitters.

At least one optical splitter may comprise at least N splitter output ports. Advantageously, this arrangement accommodates a number of potential wavelength channel distributions, including the extreme distribution in which all N wavelength channels are carried by just one optical fiber. In this example wavelength distribution, the switch is configured such that the switch input port arranged to receive the optical fiber carrying all N wavelength channels is optically coupled to the splitter input port of the splitter comprising at least N splitter output ports.

It will be appreciated that if the N wavelength channels are distributed across two input optical fibers received at respective switch input ports then one of these fibers will carry a maximum of FLOOR(N/2) wavelength channels, where the FLOOR( ) function comprises rounding the argument of the function down, towards zero, to the nearest integer. Accordingly, a second splitter belonging to said F optical splitters may comprise FLOOR(N/2) splitter output ports.

A third splitter belonging to said F optical splitters may comprise FLOOR(N/3) splitter output ports.

More generally, an $m^{th}$ splitter belonging to said F optical splitters may comprise FLOOR(N/m) splitter output ports for all FLOOR(N/m)>1, where m is any integer between 1 and F. It will be appreciated that this embodiment accommodates any possible distribution of wavelength channels across the input optical fibers. For example, if all N wavelength channels are carried on one input optical fiber then the switch input port arranged to receive this fiber would be coupled to the splitter input port of the optical splitter comprising N splitter output ports. On the other hand, if the N wavelength channels are equally distributed across the F input optical fibers such that each input optical fiber carries (N/F) wavelength channels then each switch input port would be coupled to a splitter input port but the exact coupling would be irrelevant since only (N/F) splitter output ports of any optical splitter would be utilized. The condition "for all FLOOR(N/m)>1" has been included in view of the fact that a 1×1 optical splitter would serve no purpose; such a splitter may simply be omitted. This situation arises if F>N/2, for example N=10, F=6. The splitters would be 1×10, 1×5, 1×3, 1×2, 1×2; there would not be a sixth splitter because there would always be at least one fiber carrying a single wavelength channel only (or no wavelength channels at all). In this embodiment, there would be F switch input ports and F−1 optical splitters.

Alternatively, or in addition thereto, the switch may be controllable to switch optical signals from a splitter output port of one optical splitter to a splitter input port of another optical splitter. The switch may be controllable to switch optical signals from any of the splitter output ports of any of the optical splitters to the splitter output ports of any of respective others of the optical splitters. The switching of optical signals from splitter output ports to splitter input ports of other optical splitters enables so-called cascading of splitters, thereby advantageously minimizing the number of splitter output ports that are required on a single splitter. One advantage of minimizing the total number of splitter output ports is that optical matrix switch ports are expensive. However, there may be occasions in which cascading of optical splitters is not possible or not desirable, for example if the all optical matrix switch is not suitable for cascading of splitters or if there are problems relating to loss of signal amplitude.

If cascading of optical splitters is allowed, at least one splitter cascade may have a splitting capacity of at least N.

The apparatus may comprise exactly F switch input ports and exactly F optical splitters. If cascading of optical splitters is allowed and the apparatus comprises exactly F switch input ports and exactly F optical splitters then the constraint that at least one splitter must comprise at least N splitter output ports is replaced with the constraint that at least one splitter must comprise at least (N−2(F−1)) splitter output ports. This constraint is dictated by the distribution in which all but one of the input optical fibers each carry two wavelength channels, thereby carrying 2(F−1) wavelength channels between them and leaving one of the input optical fibers to carry the remaining (N−2(F−1)) wavelength channels. Since all input optical fibers carry at least two wavelength channels, all of the switch input ports must be coupled to splitter input ports of respective optical splitters, thereby leaving a single optical splitter to split the optical signals carried on the optical fiber having (N−2(F−1)) wavelength channels.

The apparatus may comprise exactly F switch input ports and more than F optical splitters. It will be appreciated that if the apparatus comprises exactly F switch input ports and more than F optical splitters then the constraint that at least one splitter must comprise at least (N−2(F−1)) splitter output ports no longer applies. This embodiment is particularly appropriate if cascading of more than one level is allowed, i.e. if the apparatus is configured to enable splitting of optical signals by passing said signals through at least three splitters. It will be appreciated that if cascades of more than one level are allowed then one optical splitter having a large number of splitter output ports may be replaced by multiple splitters, each having a smaller number of splitter output ports. For example, if one optical splitter having X splitter output ports may be replaced by three optical splitters, each having (X+2) splitter output ports between them, the two additional splitter output ports being required for transmitting the optical signals to the two additional optical splitters.

In another aspect, an embodiment provides a method for splitting optical signals carried by F input optical fibers, the method comprising identifying the number of independent wavelength channels N carried by each of said optical fibers; for each optical fiber carrying at least two independent wavelength channels, optically coupling said input optical fiber to an optical splitter having a splitting capacity at least equal to the number of independent wavelength channels carried by said input fiber optical fiber; wherein the F optical fibers are received at respective F switch input ports of an optical matrix switch; and further comprising optically coupling output ports of the optical splitters to respective switch output ports of the optical matrix switch.

The F optical fibers may be received at respective F switch input ports of an optical matrix switch.

The method may further comprise optically coupling output ports of the optical splitters to respective switch output ports of the optical matrix switch.

The method may further comprise, for input optical fibers carrying a single wavelength channel only, optically coupling the switch input ports arranged to receive said input optical fibers to respective switch output ports. In this embodiment, optical input fibers carrying a single wavelength channel only are not coupled to optical splitters, thereby avoiding the use of unnecessary components and ports.

The method may comprise providing F optical splitters.

The method may comprise optimizing the optical coupling across all of the F input optical fibers and F optical splitters such that each input fiber is connected to an optical splitter having a splitting capacity at least equal to the minimum splitting capacity required for that optical fiber. Consider, for example, the simple case of two input optical fibers and two optical splitters, one splitter having 5 output ports and one splitter having 10 output ports: if the first input fiber carries 3 independent wavelength channels and the second input signal carries 10 independent wavelength channels then the optical signals carried by the first fiber may be sufficiently split by either splitter, but if the first input fiber is coupled to the splitter comprising 10 output ports then insufficient splitter capacity is available for the second input fiber. This problem is obviated by optimizing the coupling across all of the input optical fibers and optical switched. Advantageously, this ensures that the splitter capacity is used efficiently and the optical signals carried by each input optical fiber are split sufficiently.

The method may further comprise transmitting the optical signals output by the optical splitters to respective receivers, each receiver comprising a local tunable oscillator. Alternatively, or in addition thereto, the method may further comprise filtering the optical signals output by the optical splitters according to wavelength such that a single wavelength channel is selected within the optical signals output by each of the optical splitters. A different wavelength channel may be selected for each optical splitter output.

BRIEF DESCRIPTION OF THE DRAWINGS

Embodiments will now be described, by way of example only, with reference to the accompanying Figures in which.

DETAILED DESCRIPTION

Definitions

As used herein, a "wavelength channel" is defined as a wavelength or a spectrum of wavelengths associated with a certain signal. It will be appreciated that the term includes, but is not limited to, a single optical carrier, typically a sine wave, with modulation. The term also includes so-called "superchannels," in which multiple optical carriers (rather than a single optical carrier) are modulated and the combined group of modulated carriers are treated as a single channel.

As used herein, an "optical splitter" is defined as a device arranged to receive optical signals at an input port and output copies of the received optical signal at each of multiple output ports. A 1×N optical splitter comprises one input port and a plurality N of output ports; optical signals received at the input port are branched to all of the N output ports.

As used herein, the "splitting capacity" of a splitter is defined as the number of output ports of that splitter. The "splitting capacity" of a cascade of splitters is defined as the number of output ports of the splitters within the cascade that are not connected to input ports of another splitter in the cascade. In other words, the "splitting capacity" is the number of "final" output signals that may be produced by a splitter or cascade of splitters.

Figure 1:
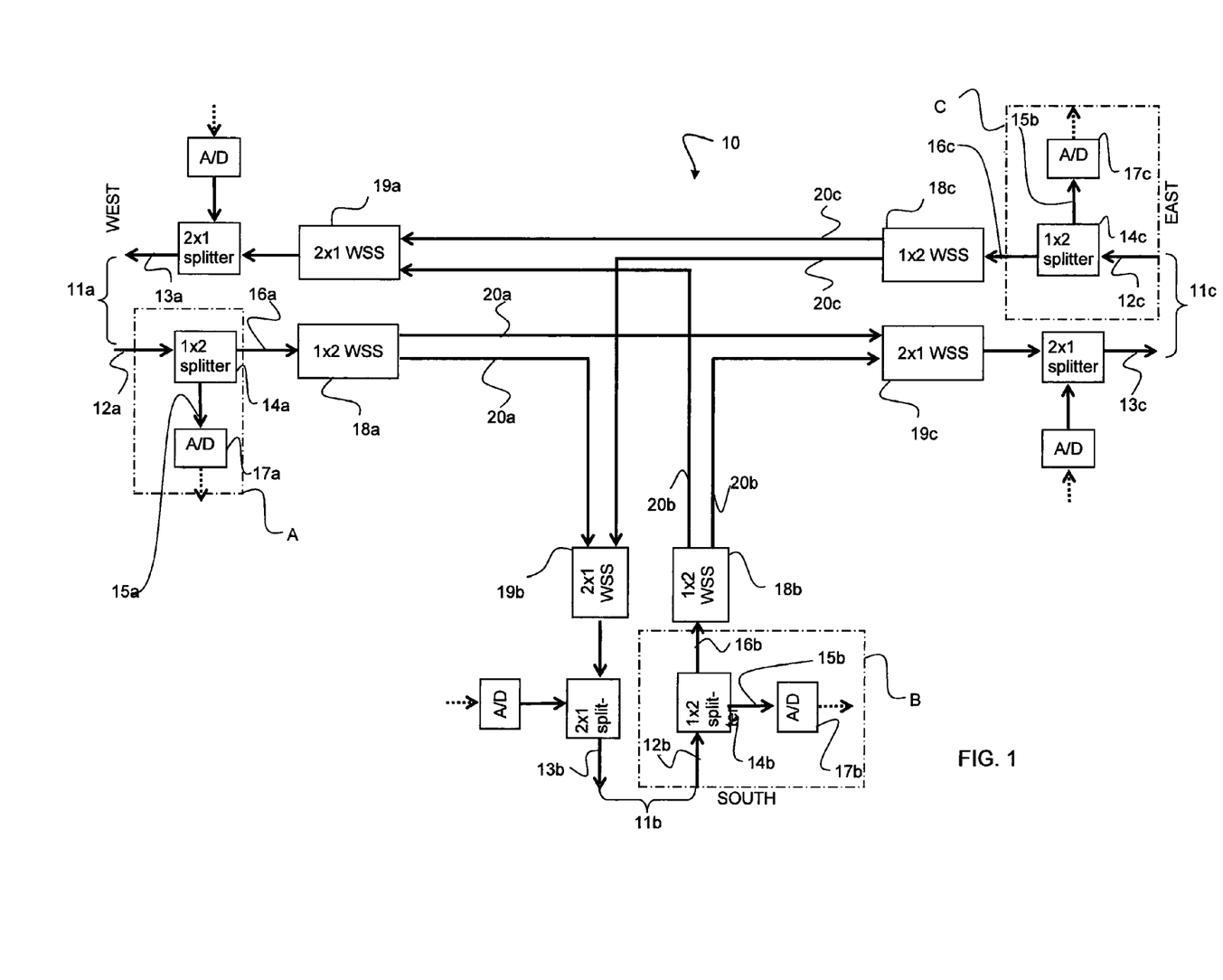
FIG. 1 shows an overview of a degree three node in a telecommunications network, the network comprising a single optical fiber in each direction.

FIG. 1 schematically illustrates a node 10 in a telecommunications network. Nodes such as that illustrated in the figure are known in the art.

The node 10 comprises three sets of optical fibers 11a, 11b, 11c. Each of the three sets of optical fibers 11 is associated with a different spatial location with respect to the node 10, thereby rendering the node a degree three node. The three spatial locations will henceforth be referred to as West, East and South for ease of reference.

Each set of optical fibers 11 is made up of two fibers: a node input fiber 12 for transporting optical signals towards the node 10 and a node output fiber 13 for transporting optical signals away from the node 10. This type of network is currently widely used across the telecommunications industry.

Each of the optical fibers 12, 13 is suitable for carrying Wavelength Division Multiplexed (WDM) optical signals, i.e. optical signals that comprise a plurality of independent wavelength channels.

At the node 10, each node input optical fiber 12 is coupled to the input port (not shown) of a 1×2 passive optical splitter 14. Each splitter 14 comprises two output ports (not shown) coupled to respective optical fibers 15, 16. The optical fibers 15, 16 are arranged to transmit optical signals from the optical splitter 14 to an add/drop (A/D) 17 or to a Reconfigurable optical add-drop multiplexer (ROADM), respectively.

The ad/drop A/D 17 is arranged for "dropping" certain wavelength channels carried by the node input optical fiber 12 at the node 10, whilst the ROADM is for routing certain wavelength channels through the node 10, e.g. from East to West.

In standard prior art nodes 10, the A/D 17 comprises a grating demultiplexer (not shown), which operates on the principle of light dispersion: the angle of deflection with respect to the normal of the demultiplexer is a function of wavelength. The grating therefore acts to break down the optical signal into its constituent wavelength spectrum, which enables certain wavelength channels within that spectrum to be isolated. The "dropped" channels can subsequently be transmitted to receivers or the like associated with the node 10, with different wavelength channels being transmitted to different receivers. For example, the node 10 may service a particular city, in which case the A/D 17 may be arranged for selecting certain wavelength channels intended to be received by receivers within the city.

The ROADM is formed of a number of Wavelength Selective Switches (WSSs) 18, 19 interconnected by optical couplings 20. In detail, a 1×2 WSS 18 is coupled to the output of the optical splitter 14 such that it receives optical signals therefrom. The outputs of the 1×2 WSS 18 are separately coupled to inputs of respective 2×1 WSSs 19 associated with directions other than the direction from which the node input fiber 12 originated. For example, the outputs of the West 1×2 WSS 18a are coupled to the inputs of the East 2×1 WSS 19c and South 2×1 WSS 19b. It will be appreciated that the 1×2 WSSs 18 and 2×1 WSSs 19 are appropriate for a degree three node 10, but the number of input and output ports provided on the WSSs 18, 19 may be varied in accordance with the degree of the node.

Whilst optical nodes 10 comprising a single fiber in each direction as illustrated in FIG. 1 are currently widely used, it is expected that a single fiber in each direction will not be sufficient to cope with the ever increasing bandwidth demands. Accordingly, it is anticipated that future optical nodes will have to cope with multiple optical fibers per direction, each optical fiber potentially carrying a plurality of independent wavelength channels.

Figure 2:
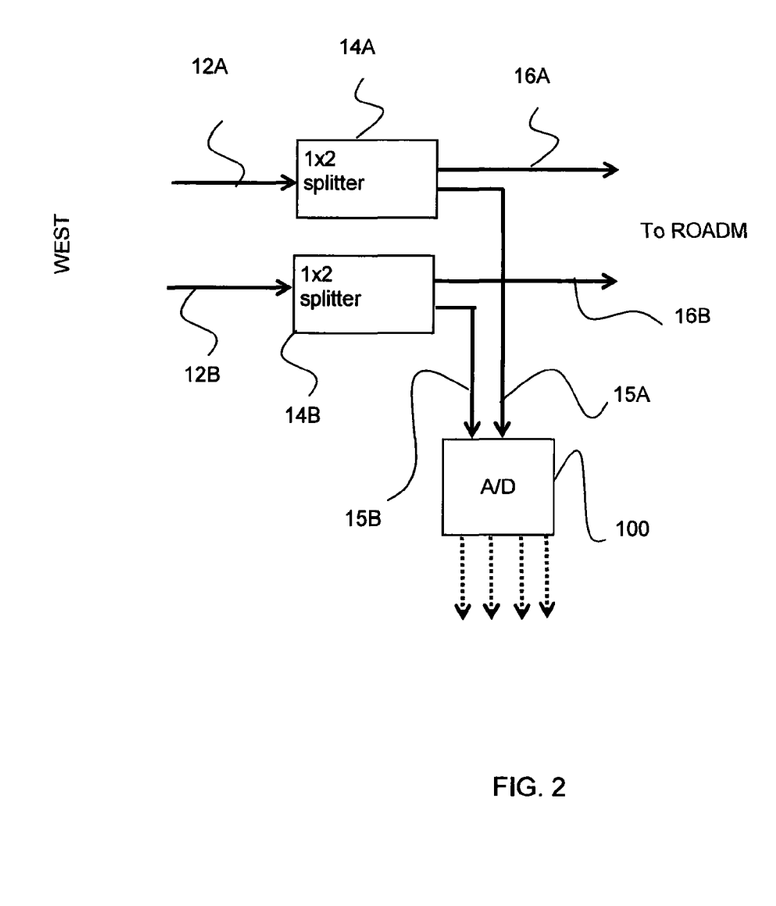
FIG. 2 shows a portion of node of a telecommunications network, the network comprising two optical fibers in each direction.

FIG. 2 illustrates a portion of an optical node suitable for use with two optical fibers per direction. The portion of the node illustrated in FIG. 2 is analogous to the any one of the portions shown in boxes (a), (b) or (c) in FIG. 1. For ease of reference, like parts have been given like reference numerals, with upper case alphabetic characters added in the case of pluralities of like parts. It should be noted that the upper case alphabetic character referencing system of FIGS. 2 to 4 is unrelated to the lower case alphabetic character referencing system of FIG. 1.

For the case of two optical fibers per direction, each of the node input optical fibers 12A, 12B from a given direction is received at respective 1×2 passive optical splitters 14A, 14B. For example, each of the optical fibers that arrive from West is passed to respective 1×2 optical passive splitters. Each of the 1×2 optical splitters 14 comprises two output ports (not shown). One output port is coupled to an A/D 100 by an optical fiber 15 and the other output port is coupled to a ROADM by another optical fiber 16.

The A/D 100 is arranged for "dropping" certain wavelength channels at the node, whilst the ROADM is arranged for routing certain wavelength channels through the node, e.g. from East to West. Since there are two node input fibers 12A, 12B entering the node from each direction, the ROADM must be configured to receive two input optical fibers 16A, 16B from each direction. A suitable ROADM is disclosed in co-pending application GB1305801.1 of even-date, entitled Optical Switch, also published as WO 2014/155033. Similarly, each A/D 100 within the node receives two input optical fibers 15A, 15B.

Figure 3:
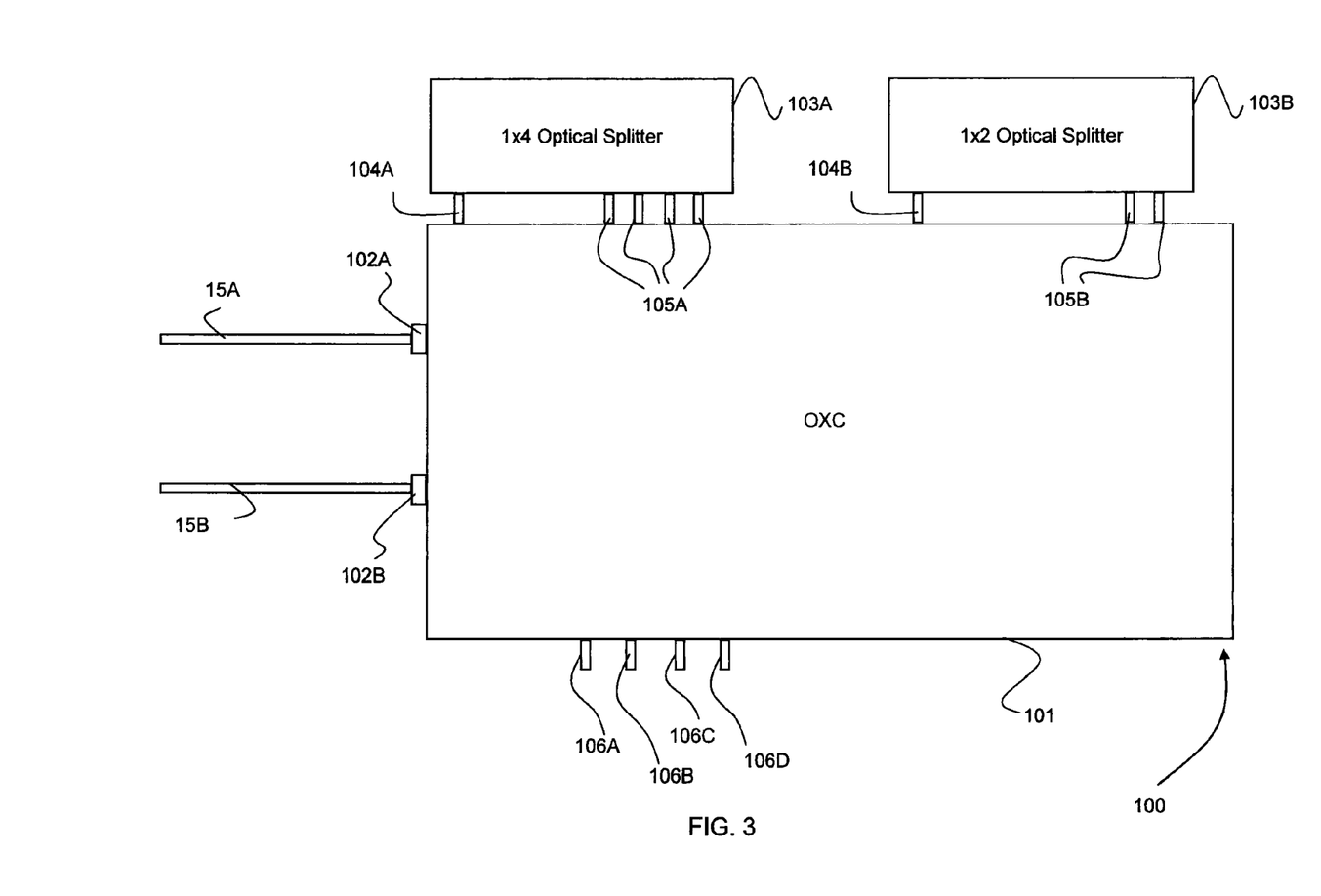
FIG. 3 shows an apparatus for splitting optical signals in accordance with an embodiment.
Figure 4:
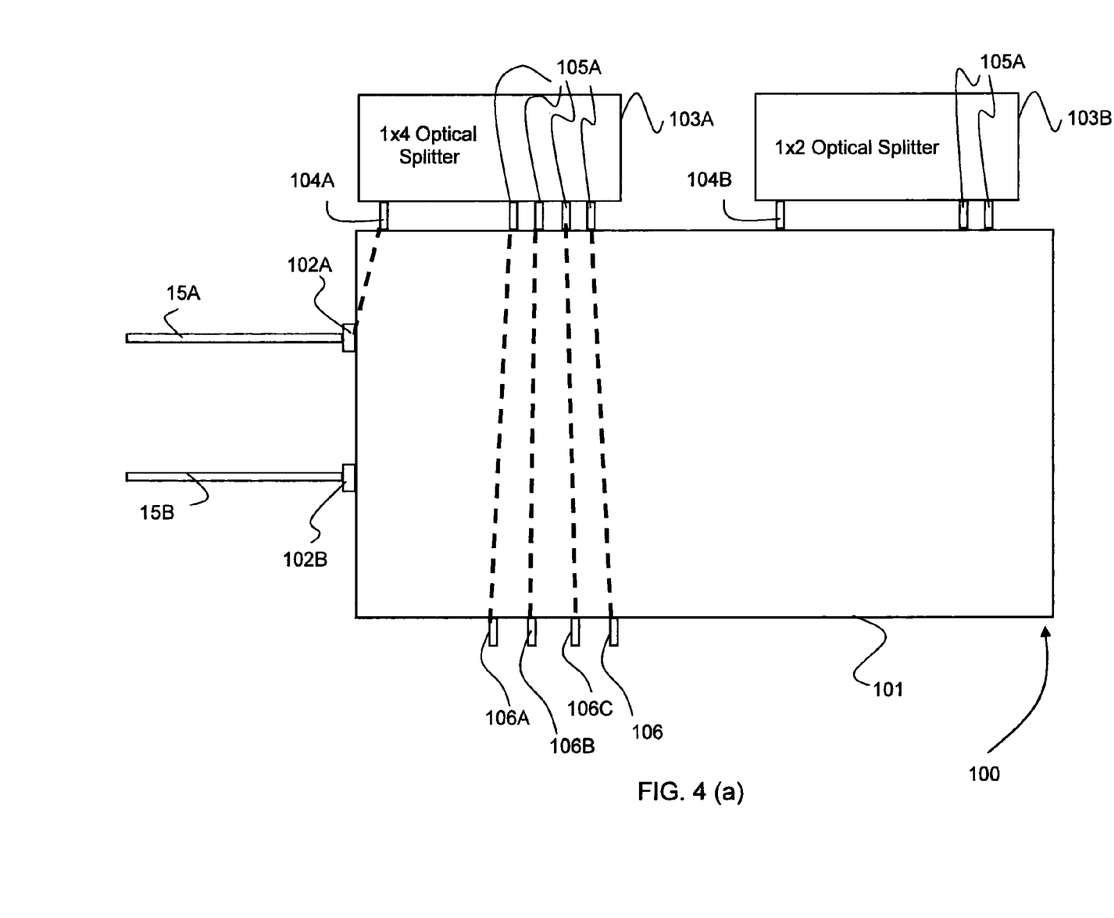
FIGS. 4(a) to 4(c) show alternative optical coupling configurations of the apparatus of FIG. 3.

The A/D 100 of FIG. 2 is shown in greater detail in FIGS. 3 and 4 of the drawings. It is envisaged that the embodiment illustrated in FIGS. 3 and 4 will be suitable for the case in which the two node input fibers 12A, 12B carry optical signals that together comprise up to four independent wavelength channels. It is anticipated that the distribution of wavelength channels between the node input fibers 12 of a multi-fiber network such as that illustrated in FIG. 2 is likely to vary during the lifetime of the network, for example in accordance with the network architecture and the portion of the optical spectrum covered by the independent wavelength channels. The A/D 100 is capable of operating under any distribution of the four independent wavelength channels across the two node input fibers 12A, 12B.

With particular reference to FIGS. 3 and 4 of the drawings, the A/D 100 comprises an all optical matrix switch in the form of an Optical Cross-Connect (OXC) 101. The OXC 101 is configured to switch fibers to fibers, leaving the optical spectrum carried by the fibers intact. It will be appreciated that this is in contrast to a ROADM, which receives a fiber input, divides the optical spectrum carried on that fiber, and routes different wavelengths to different outputs.

The OXC 101 may comprise a matrix of optical fibers with reconfiguration of the optical fibers between different ports of the OXC achieved by applying varying voltages to the optical fibers. Alternatively, the OXC may comprise MEMs optical elements or any other suitable all optical matrix switch known in the art.

The two switch input ports 102A, 102B are arranged to receive respective input optical fibers 15A, 15B. For ease of reference, these input optical fibers 15A, 15B will henceforth be referred to as first 15A and second 15B input optical fibers, and the switch input ports 102A, 102B as first 102A and second 102B switch input ports.

Two passive optical splitters 103A, 103B are connected to the OXC 101. The first optical splitter 103A is a 1×4 optical splitter, comprising a splitter input port 104A and four splitter output ports 105A. Accordingly, the first optical splitter 103A is arranged for producing four identical copies of any signal received at the input port 104A thereof. The second optical splitter 103B is a 1×2 optical splitter, comprising a splitter input port 104B and two splitter output ports 105B. Accordingly, the second optical splitter 103B is arranged for producing two identical copies of any signal received at the input port 104B thereof. The splitter input ports 104 and the splitter output ports 105 of each optical splitter 103 constitute respective ports of the OXC 101.

The fiber matrix connections within the OXC 101 may be reconfigured according to the distribution of wavelength channels between the two input optical fibers 15A, 15B and hence according to the distribution of wavelength channels between the two node input fibers 12A, 12B. It is envisaged that the A/D 100 will be a slave to a control plane function, with reconfiguration of the fiber matrix connections within the OXC 101 achieved by means of a network wide control. However, an "intelligent" A/D is also within the scope of embodiments. For example, the A/D may itself determine the wavelength channel distribution and reconfigure the fiber matrix connections within the OXC 101 appropriately.

FIGS. 4(a) to 4(c) illustrate example optical couplings between the switch input ports 102, the optical splitters 103 and the switch output ports 106. In each case, the optical coupling is achieved by means of fiber matrix connections of the OXC 101.

FIG. 4(a) illustrates an exemplary configuration of the A/D 100 for the case of four independent wavelength channels received at the first switch input port 102A. It will be appreciated that each independent wavelength channel is likely to be destined for a different receiver. It is therefore desirable to produce four copies of the optical signals received at the first switch input port 102A. Accordingly, it is envisaged that a user will control the OXC 101 to switch optical signals arriving at the first switch input port 102A to the splitter input port 104A of the 1×4 optical splitter 103A. The user will further control the OXC 101 to optically couple each of the splitter output ports 105A to respective switch output ports 106. No optical coupling is required in respect of the second switch input port 102B since no wavelength channels are received at this port.

In use, the OXC 101 transmits optical signals received at the first switch input port 102A to the splitter input port 104A of the 1×4 optical splitter 103A. The 1×4 optical splitter 103A branches the optical signals into four identical copies and outputs each of these copies at respective splitter output ports 105A. The OXC 101 transmits the optical signals from the splitter output ports 105A to respective switch output ports 106. Accordingly, each of the switch output ports 106 outputs optical signals identical to those received at the first switch input port 102A. The A/D 100 provides no wavelength filtering itself; is envisaged that each of the switch output ports 106 will be coupled to respective receivers, each receiver comprising a local tunable oscillator. Each receiver may be arranged to select a different wavelength channel. Alternatively, optical signals output from the switch output ports 106 could be subsequently filtered according to wavelength such that each wavelength channel may be carried on a dedicated optical fiber.

FIG. 4(b) illustrates an exemplary configuration of the A/D 100 for the case of one wavelength channel received at the first switch input port 102A and three wavelength channels received at the second switch input port 102B. It will be appreciated that it is not necessary to split optical signals comprising just one wavelength channel. Accordingly, for a wavelength channel distribution such as this, it is envisaged that a user will control the OXC 101 to switch optical signals arriving at the first switch input port 102A directly to a switch output port 106A. The user will further control the OXC 101 to switch optical signals arriving at the second switch input port 102B to the splitter input port of the 1×4 optical splitter 103A. Three of the four splitter output ports 105A of the 1×4 optical splitter 103A will be coupled to respective switch output ports 106B, 106C, 106D.

In use, the OXC 101 transmits optical signals received at the first switch input port 102A directly to the corresponding switch output port 106A. The OXC 101 simultaneously transmits optical signals received at the second switch input port 102B to the splitter input port 104A of the 1×4 optical splitter 103A. The 1×4 optical splitter 103A branches the optical signals into four identical copies and outputs each of these copies at respective splitter output ports 105A. One of these output ports 105A is not optically coupled to any other port and thus the optical signals output at this port are essentially blocked. However, the OXC 101 transmits the optical signals from the other three splitter output ports 105A to respective switch output ports 106B, 106C, 106D. Accordingly, one of the switch output ports 106A outputs optical signals identical to those received at the first switch input port 102A, these optical signals comprising one wavelength channel. The other three switch output ports 106B, 106C, 106D simultaneously output optical signals identical to those received at the second switch output port, these optical signals comprising three wavelength channels. Again, it is envisaged that each of the switch output ports 106 will be coupled to respective receivers. The receiver coupled to the first switch output port 106A therefore receives the optical signals that enter the A/D 100 via the first switch input port 102A, whilst the receivers coupled to the second, third and fourth switch output ports 106B, 106C, 106D receive the optical signals that enter the A/D via the second switch input port 102B. It will, however, be appreciated that any receiver may receive any of the optical signals by simply reconfiguring the fiber matrix connections between the switch input ports 102, optical splitters 103 and switch output ports 106.

FIG. 4(c) illustrates an exemplary configuration of the A/D 100 for the case of two wavelength channel received at the first switch input port 102A and two wavelength channels received at the second switch input port 102B. For a wavelength channel distribution such as this, optical signals received at each switch input port 102A, 102B must be split into two identical copies. The figure illustrates optical coupling between the first switch input port 102A and the splitter input port 104A of the 1×4 optical splitter 103A and simultaneous optical coupling between the second switch input port 103B and the splitter input port 104B of the 1×2 optical splitter 104B. However, it will be appreciated that this coupling may be reversed: optical signals arriving at the first switch input port 102A may be switched to the splitter input port 104B of the 1×2 optical splitter 103B, whilst optical signals arriving at the second switch input port 102B may be switched to the splitter input port 104A of the 1×4 optical splitter 103A. In either case, two of the splitter output ports 105A of the 1×4 optical splitter 103A and both of the splitter output ports 105B of the 1×2 optical splitter 103B will be optically coupled to respective switch output ports 106.

In use, the OXC 101 transmits optical signals received at the first switch input port 102A to the splitter input port 104A of the 1×4 optical splitter 103A. The 1×4 optical splitter 103A branches the optical signals into four identical copies and outputs each of these copies at respective splitter output ports 105A. Two of these output ports 105A are not optically coupled to any other port and thus the optical signals output at this port are essentially blocked. However, the OXC 101 transmits the optical signals from the other two splitter output ports 105A to respective switch output ports 106A, 106B. The OXC 101 simultaneously transmits optical signals received at the second switch input port 102B to the splitter input port 104B of the 1×2 optical splitter 103B. The 1×2 optical splitter 103B branches the optical signals into two identical copies and outputs each of these copies at respective splitter output ports 105B. The OXC 101 transmits the optical signals from the splitter output ports 103B to respective switch output ports 106C, 106D. Accordingly, two of the switch output ports 106A, 106B output optical signals identical to those received at the first switch input port 102A whilst the other two switch output ports 106C, 106D output optical signals identical to those received at the second switch input port 102B. Again, any receiver may receive any of the optical signals by simply reconfiguring the fiber matrix connections between the switch input ports 102, optical splitters 103 and switch output ports 106.

Whilst FIGS. 2 to 4 illustrate the case of two optical fibers per direction, it will be appreciated that the node and A/D may be easily adapted for any number of optical fibers per direction.

Figure 5:
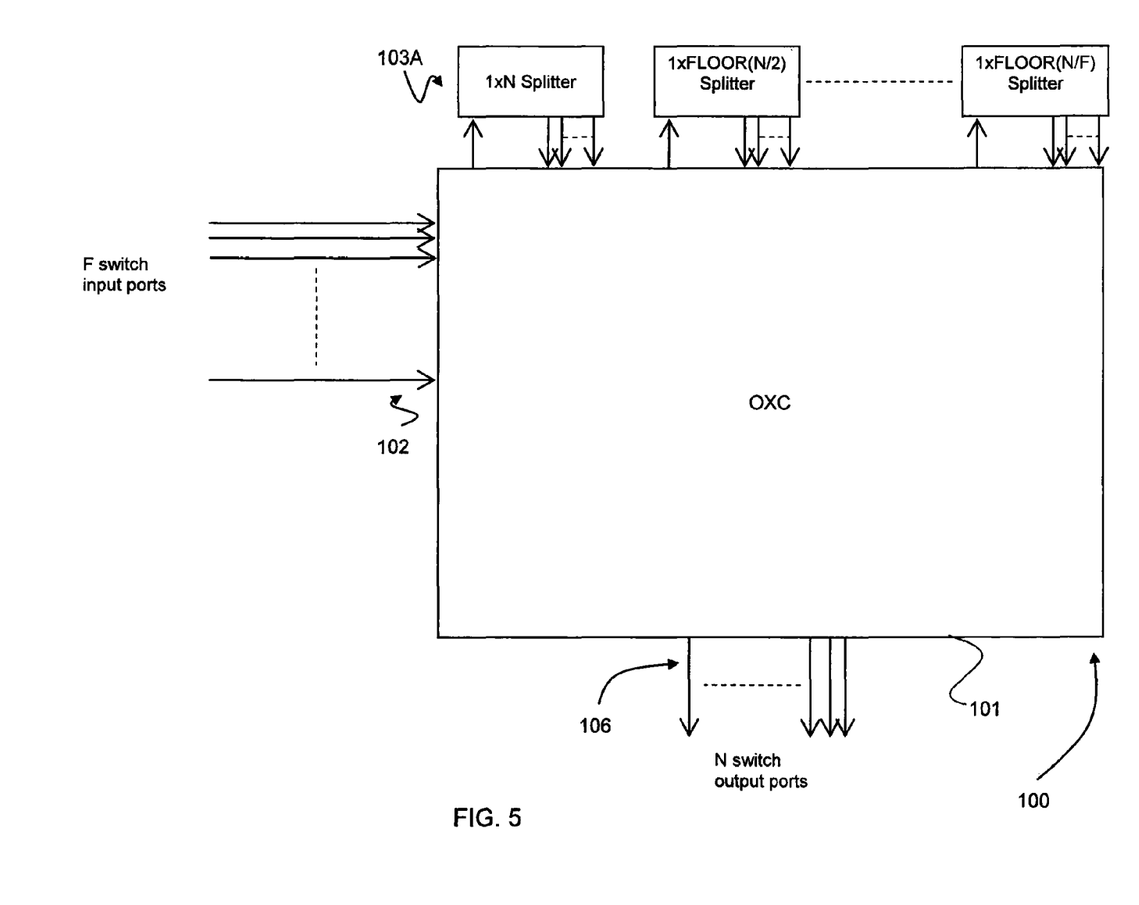
FIG. 5 shows an apparatus for splitting optical signals in accordance with an alternative embodiment.

FIG. 5 illustrates an embodiment in which the A/D is arranged to receive F optical fibers, the fibers together carrying optical signals comprising N independent wavelength channels. For ease of reference, like parts have been given like reference numerals.

The embodiment illustrated in FIG. 5 is an exemplary embodiment if no cascading of optical splitters is allowed. In detail, the A/D comprises an OXC having F switch input ports and N switch output ports. The A/D further comprises exactly F optical splitters with splitter input ports and splitter output ports defining ports of the OXC. Each of the optical splitters comprises a different number of splitter output ports.

In detail, one of the optical splitters is a 1×N optical splitter i.e. the optical splitter has N splitter output ports. Accordingly, if all of the independent wavelength channels N are received at a single switch input port then this switch input port may be coupled to the splitter input port of the 1×N optical splitter via the OXC.

Another optical splitter is a 1×FLOOR(N/2) wavelength channels, where the FLOOR( ) function comprises rounding the argument of the function down, towards zero, if it is a non-integer value to the nearest integer. It will be appreciated that if the N wavelength channels are distributed across two input optical fibers then one of these fibers will carry a maximum of FLOOR(N/2) wavelength channels. Accordingly, to cope with equal distribution of wavelength channels across two input optical fibers then it is necessary for at least one optical splitter to comprise at least FLOOR(N/2) splitter output ports and at least another optical splitter to comprise at least CEILING(N/2) splitter output ports, where the CEILING( ) function comprises rounding the argument of the function up, if it is not an integer value, to the nearest integer. It will be appreciated that the splitter comprising N splitter output ports addresses the demand for an optical splitter comprising at least CEILING(N/2) splitter output ports.

A third splitter is a 1×FLOOR(N/3) optical splitter. The motivation for providing a third optical splitter comprising FLOOR(N/3) splitter output ports is analogous to that discussed above in relation to the 1×FLOOR(N/2) wavelength channels but in relation to a wavelength distribution across three input optical fibers.

More generally, the $m^{th}$ splitter belonging to the F optical splitters is a 1×FLOOR(N/m) optical splitter, where m is any integer between 1 and F. It will be appreciated that this embodiment accommodates any possible distribution of wavelength channels across the input optical fibers. For example, if all N wavelength channels are carried on one input optical fiber then the switch input port arranged to receive this fiber would be coupled to the splitter input port of the optical splitter comprising N splitter output ports. On the other hand, if the N wavelength channels are equally distributed across the F input optical fibers such that each input optical fiber carries (N/F) wavelength channels then each switch input port would be coupled to a splitter input port but the exact coupling would be irrelevant since only (N/F) splitter output ports of any optical splitter would be utilized.

In another embodiment, the apparatus may be configured to allow cascading of optical splitters. If only one level of splitter cascading is permitted, for example due to constraints of the OXC or problems relating to loss of signal amplitude, it is envisaged that the add/drop A/D will comprise exactly F switch input ports and exactly F optical splitters. It has been found by the applicants that this arrangement minimizes the total number of ports required on the OXC and hence provides an economic advantage. In contrast to the embodiments in which no cascading of optical splitters is permitted, it is not necessary for a single optical splitter to comprise N splitter output ports: if a single switch input port receives all N wavelength channels then this switch input port can be switched to a first optical splitter comprising a first number of splitter output ports, one or more of which can be optically coupled to splitter input ports of other optical splitters.

Instead, the minimum number of splitter output ports required by at least one of the optical splitters is dictated by the wavelength distribution in which all but one of the switch input ports receive optical signals comprising two wavelength channels, thereby leaving one switch input port to receive the remaining N−2(F−1) wavelength channels. Since all switch input ports receive optical signals comprising at least two wavelength channels, all of the switch input ports must be coupled to splitter input ports of respective optical splitters, thus leaving a single optical splitter to split the optical signals from the switch input port receiving N−2(F−1) wavelength channels. Accordingly, if cascading of optical splitters is allowed then the constraint that at least one splitter must comprise at least N splitter output ports is replaced with the constraint that at least one splitter must comprise at least (N−2(F−1)) splitter output ports.

Figure 6:
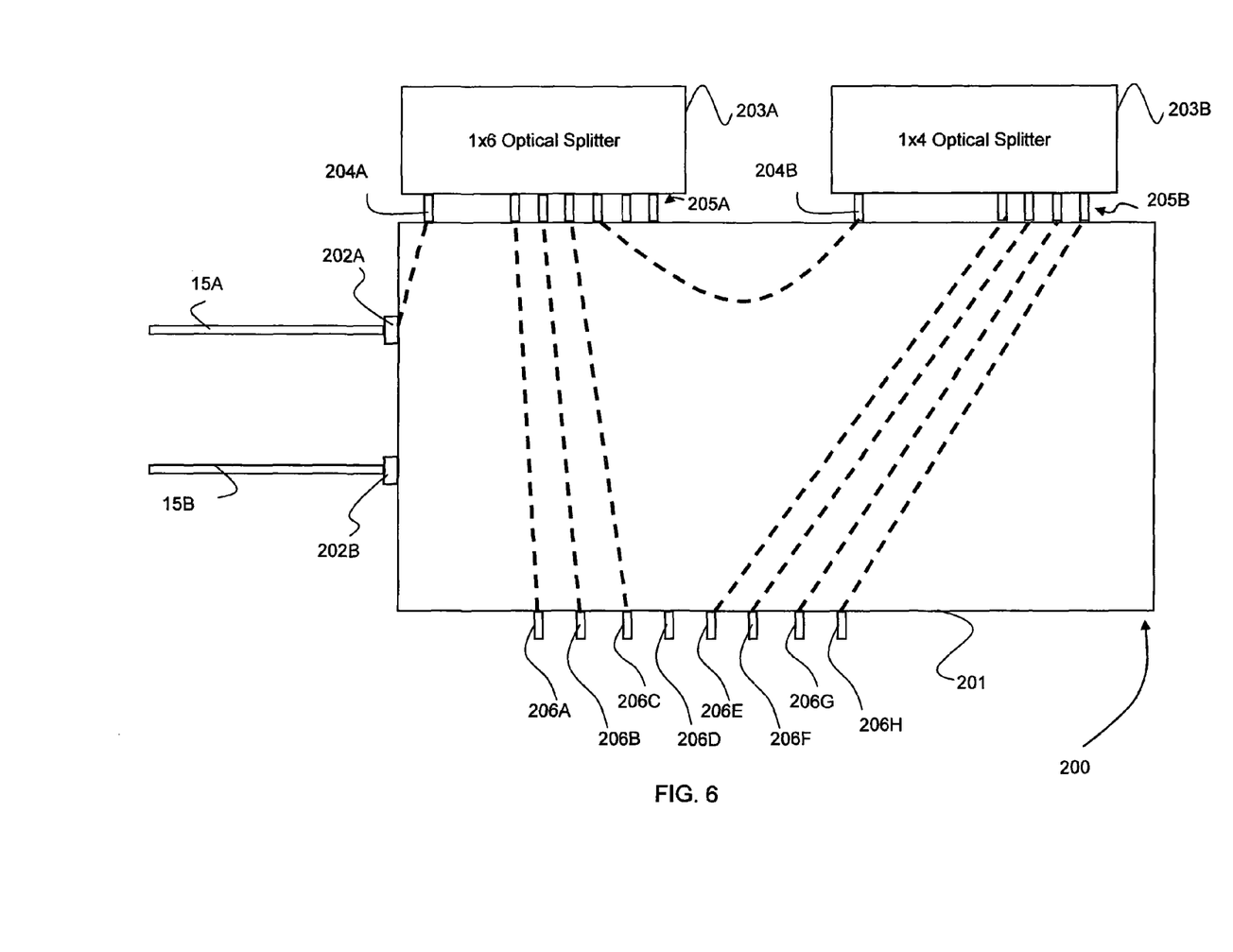
FIG. 6 shows an apparatus for splitting optical signals in accordance with an alternative embodiment in which one level of cascading of splitters is allowed.

An embodiment in which one level of splitter cascading is permitted is illustrated in FIG. 6. In this embodiment, the add/drop A/D 200 comprises an Optical Cross Connect (OXC) 201 having two switch input ports 202A, 202B arranged to receive respective input optical fibers 15A, 15B and eight switch output ports 206A-206H. The two input optical fibers 15A, 15B are configured for carrying eight independent wavelength channels, the distribution of the channels across the two input optical fibers being reconfigurable. Accordingly, if it were not possible or not desirable to cascade optical splitters then one splitter having eight output ports and one splitter having four output ports would be required. However, if a single splitter cascade is allowed then the 1×8 optical splitter can in fact be replaced by a 1×6 optical splitter. Accordingly, the add/drop A/D 200 illustrated in FIG. 6 comprises two optical splitters, the first optical splitter 203A comprising six splitter output ports 205A and the second optical splitter 203B comprising four splitter output ports 205B. As illustrated in the figure, if all wavelength channels are received at one of the switch input ports 202A then the OXC 201 may be configured to switch the optical signals arriving at this input port 202A to the first optical splitter 203A. Four of the output ports 205A of this first optical splitter 203A are optically coupled to respective output ports 206A, 206B, 206C of the OXC 201, whilst one of the output ports 205A is optically coupled to the splitter input port 204B of the second optical splitter 203B.

In use, the OXC 201 transmits optical signals received at the first switch input port 202A to the splitter input port 204A of the 1×6 optical splitter 203A. The 1×6 optical splitter 203A branches the optical signals into six identical copies and outputs each of these copies at respective splitter output ports 205A. The OXC 201 transmits the optical signals from four of the splitter output ports 205A to respective switch output ports 206A, 206B, 206C, 206D and optical signals from one the splitter output ports 205A to the splitter input port 204B of the 1×4 optical splitter 203B. The 1×4 optical splitter 203B branches the optical signals into four identical copies and outputs each of these copies at respective splitter output ports 205B. The OXC 201 transmits the optical signals from the four splitter output ports 205A to respective switch output ports 206E, 206F, 206G, 206H. Accordingly, all eight of the switch output ports 206 output optical signals identical (except for the power level) to those received at the first switch input port 202A.

It will be appreciated that the configuration illustrated in FIG. 6 is not the only possible configuration if all N wavelength channels are received at the first switch input port 202A. For example, five of the splitter output ports 205A of the 1×6 optical splitter 203A could be coupled to respective splitter output ports 206, whilst only three of the splitter output ports 205B of the 1×4 optical splitter 203B could be coupled to respective splitter output ports 206.

Figure 7:
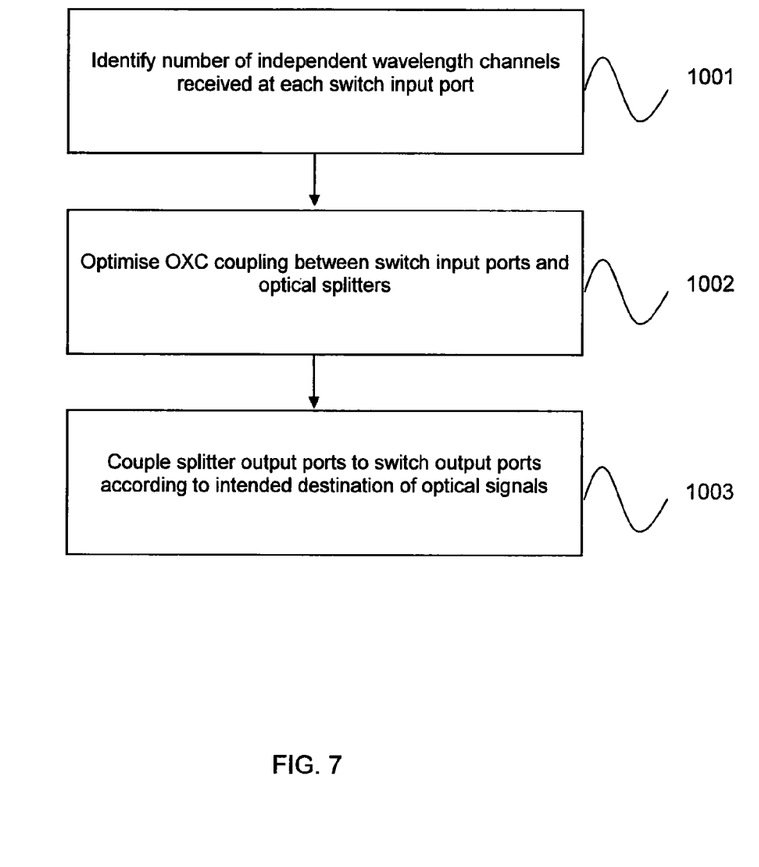
FIG. 7 shows a flow diagram illustrating a method of splitting optical signals in accordance with an embodiment.

FIG. 7 shows a method of splitting optical signals in accordance with an embodiment. The method may be implemented on any one of the add/drops illustrated in FIGS. 3 to 6. With reference to FIG. 7, the method comprises identifying the number of independent wavelength channels received at each of the switch input ports 102, 202 at 1001. It is envisaged that this information will be available upon installation of the network; no measurement or analysis of the optical signals will be required.

Once the number of wavelength channels received at each of the switch input ports 102, 202 is known, 1002 of the method comprises optimizing the OXC 101, 201 connections between the switch input ports 102, 202 and the splitter input ports 104, 204 in accordance with the number of wavelength channels received at each switch input port 102, 202. It is envisaged that this will be an optimization across all of the switch input ports 102, 202 and optical splitters 103, 203 such that each switch input port 101, 201 is connected to an optical splitter 103, 203 having at least as many splitter output ports 105, 205 as the number of wavelength channels received at said switch input port 101, 201. If a switch input port 102, 202 receives a single wavelength channel only then this switch input port 102, 202 can be directly connected to a splitter output port 106, 206, thereby avoiding the use of unnecessary components and ports. Furthermore, if a switch input port 102, 202 does not receive any wavelength channels then no connection to this switch input port 102, 202 is required.

At 1003 the method comprises configuring the OXC 102, 202 to couple the splitter output ports 105, 205 to switch output ports 106, 206 according to the intended destinations of the optical signals. It is envisaged that each of the switch output ports 106, 206 will arranged for providing optical signals to respective receivers. Accordingly, in order to provide optical signals to the receiver connected to the first switch output port 106A, 206A, the splitter output port 105, 205 of the optical splitter 103, 203 receiving the relevant optical signals must be optically coupled to the first switch output port 106A, 206A. Alternatively, the switch input port 102, 202 receiving the relevant optical signals may be directly coupled to the first switch output port 106A, 206A if the optical signals comprise one wavelength channel only and thus have no destination other than the receiver coupled to the first switch output port 106A, 206A.

It is envisaged that 1002 and 1003 will be performed concurrently. The connections provided by the OXC 101, 102 may be controlled by means of a control plane function having overall network control.

The method may further comprise transmitting the optical signals output by the optical splitters to respective receivers, each receiver comprising a local tunable oscillator. Alternatively, or in addition thereto, the method may further comprise filtering the optical signals output by the optical splitters according to wavelength such that a single wavelength channel is selected within the optical signals output by each of the switch output ports. A different wavelength channel may be selected for each switch output port.

Alternatives and Modifications

Whilst the apparatus has been described in relation to an add/drop of an optical node, it will be appreciated that it is not limited to this application; it is suitable for splitting optical signals at any point within a network comprising optical data transmission.

FIG. 6 illustrates an embodiment in which the apparatus is configured to allow a single level of cascading of optical splitters. In another embodiment, the apparatus may be configured to allow multiple levels of cascading of optical splitters, i.e. optical signals may be passed through three or more optical splitters before passing to the switch output ports of the OXC. In this embodiment it has been found that the total number of OXC ports is minimized if, for exactly F switch input ports, more than F optical splitters are provided. Each of these may have a relatively small splitting capacity, for example 1×2, 1×4 and 1×8 optical splitters. It will be appreciated that if there are more optical splitters than switch input ports then the constraint that at least one splitter must comprise (N−2(F−1)) output ports no longer applies. The table below provides example optical splitter arrangements for an apparatus configured to allow two levels of cascading of optical splitters.

In the illustrated embodiments, the A/D is branched from the node input fibers by a 1×2 optical splitter. In an alternative embodiment, the 1×2 optical splitters could be removed and an additional output port could be provided on each optical splitter within the apparatus, said additional output ports being coupled to the ROADM in the same way as one of the outputs of each of the 1×2 splitters is coupled to the ROADM in FIG. 2.

The invention claimed is:

1. An apparatus for splitting optical signals, the apparatus being configured to handle optical signals comprising up to N independent wavelength channels, the apparatus comprising:
   F passive optical splitters, each passive optical splitter comprising a splitter input port and a plurality of splitter output ports, at least one of said passive optical splitters comprising a different number of splitter output ports than at least another of said passive optical splitters;
   an all optical matrix switch comprising F switch input ports, the all optical matrix switch being controllable to switch optical signals arriving at any of the F switch input ports to the splitter input port of any of the F passive optical splitters,
   wherein the splitter input ports and the splitter output ports define ports of the all optical matrix switch.

2. An apparatus according to claim 1, wherein the all optical matrix switch is controllable by a human user.

3. An apparatus according to claim 1, wherein the all optical matrix switch comprises N switch output ports.

4. An apparatus according to claim 3, wherein the all optical matrix switch is controllable to switch optical signals from any of the splitter output ports to any of the switch output ports.

5. An apparatus according to claim 1, wherein the F optical splitters are 1×M passive optical splitters, where M is an integer greater than one and M may be different for each F optical splitter.

6. An apparatus according to claim 1, wherein each of the F optical splitters is suitable for receiving optical signals comprising a plurality of independent wavelength channels.

7. An apparatus according to claim 1, the apparatus comprising exactly F switch input ports and exactly F optical splitters.

8. An apparatus according to claim 7, wherein an $m^{th}$ splitter belonging to said F optical splitters comprises FLOOR(N/m) splitter output port, where m is any integer from 1 to F and the FLOOR( ) function comprises rounding the argument of the function down, towards zero, to the nearest integer.

9. An apparatus according to claim 1, wherein at least one of the F optical splitters comprises N splitter output ports.

10. An apparatus according to claim 1, wherein the optical matrix switch is controllable to switch optical signals from a splitter output port of one of the F optical splitters to a splitter input port of another of the F optical splitters.

| N | F | Number of 1 × 2 splitters | Number of 1 × 4 splitters | Number of 1 × 8 splitters | Number of 1 × 16 splitters | Number of 1 × 32 splitters | Number of 1 × 64 splitters | Number of 1 × 128 splitters | OXC Ports | Total number of splitters |
|---|---|---|---|---|---|---|---|---|---|---|
| 17 | 4 | 3 | 5 | 0 | 0 | 0 | 0 | 0 | 34 | 8 |
| 33 | 4 | 3 | 3 | 4 | 0 | 0 | 0 | 0 | 60 | 10 |
| 33 | 8 | 3 | 10 | 1 | 0 | 0 | 0 | 0 | 68 | 14 |
| 65 | 4 | 2 | 2 | 2 | 4 | 0 | 0 | 0 | 102 | 10 |
| 129 | 4 | 2 | 1 | 2 | 2 | 4 | 0 | 0 | 195 | 11 |

11. An apparatus according to claim 10, wherein at least one of the F optical splitters comprises (N−2(F−1)) splitter output ports.

12. An apparatus according to claim 10, wherein the apparatus comprises exactly F switch input ports and more than F optical splitters.

13. An apparatus according to claim 1, wherein the optical matrix switch is controllable to switch optical signals from any of the splitter output ports of any of the F optical splitters to the splitter output ports of any of respective others of the F optical splitters.

14. An optical network for carrying optical data signals, comprising at least one apparatus according to claim 1.

15. An optical network according to claim 14, wherein each of the F switch input ports is arranged to receive a respective input optical fiber, at least one of said input optical fibers being arranged to carry optical signals comprising a plurality of independent wavelength channels.

16. An apparatus for splitting optical signals, the apparatus being configured to handle optical signals comprising up to N independent wavelength channels, the apparatus comprising:
F optical splitters, each optical splitter comprising a splitter input port and a plurality of splitter output ports, at least one of the optical splitters comprising a different number of splitter output ports than at least another of the optical splitters; and
an all optical matrix switch comprising F switch input ports, the all optical matrix switch being controllable to switch optical signals arriving at any of the F switch input ports to the splitter input port of any of the F passive optical splitters,
wherein the splitter input ports and the splitter output ports define ports of the all optical matrix switch and the F optical splitters are not wavelength selective.

17. A method for splitting optical signals carried by F input optical fibers, the method comprising:
identifying a number of independent wavelength channels N carried by each of said F input optical fibers;
for each of said F input optical fibers carrying at least two independent wavelength channels, optically coupling said input optical fiber to a passive optical splitter having a splitting capacity at least equal to the number of independent wavelength channels N carried by said input optical fiber;
wherein the F input optical fibers are received at respective F switch input ports of an optical matrix switch;
and further comprising optically coupling output ports of the optical splitters to respective switch output ports of the optical matrix switch.

18. A method according to claim 17, further comprising, for input optical fibers carrying a single wavelength channel only, optically coupling the switch input ports arranged to receive said input optical fibers to respective switch output ports.

19. A method according to claim 17, further comprising providing F optical splitters and optimizing the optical coupling across all of the F input optical fibers and F optical splitters such that each input fiber is connected to an optical splitter having a splitting capacity at least equal to the minimum splitting capacity required for that optical fiber.

20. A method according to claim 17, further comprising transmitting the optical signals output by the optical splitters to respective receivers, each receiver comprising a local tunable oscillator.

21. A method according to claim 17, further comprising filtering the optical signals output by the optical splitters according to wavelength such that a single wavelength channel is selected within the optical signals output by each of the optical splitters.

\* \* \* \* \*